United States Patent
Carlson-Lee

(10) Patent No.: US 10,440,963 B2
(45) Date of Patent: *Oct. 15, 2019

(54) GRANULATED STARCH SALT SUBSTITUTE

(71) Applicant: Open Door Foods, LLC, Minneapolis, MN (US)

(72) Inventor: Brent Carlson-Lee, Minneapolis, MN (US)

(73) Assignee: Open Door Foods, LLC, Minneapolis, MN (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/601,554

(22) Filed: May 22, 2017

(65) Prior Publication Data

US 2017/0251680 A1    Sep. 7, 2017

Related U.S. Application Data

(63) Continuation-in-part of application No. 14/136,400, filed on Dec. 20, 2013, now Pat. No. 9,961,918,
(Continued)

(51) Int. Cl.
| | | |
|---|---|---|
| A23G 3/42 | (2006.01) | |
| A21D 10/00 | (2006.01) | |
| A21D 8/02 | (2006.01) | |
| A23L 29/212 | (2016.01) | |
| A23L 29/00 | (2016.01) | |

(Continued)

(52) U.S. Cl.
CPC ............. *A21D 10/005* (2013.01); *A21D 4/00* (2013.01); *A21D 8/02* (2013.01); *A21D 13/22* (2017.01);
(Continued)

(58) Field of Classification Search
None
See application file for complete search history.

(56) References Cited

U.S. PATENT DOCUMENTS 5,350,593 A    9/1994  LaCourse et al.
5,508,050 A    4/1996  Miki et al.
(Continued)

FOREIGN PATENT DOCUMENTS

EP    0668017    8/1995
EP    2042038    4/2009
(Continued)

OTHER PUBLICATIONS

Mintel: May 2011 (May 2011), Anonymous: "Spring Rolls with Sweet and Sour Sauce", XP002739028, Database accession No. 1557046 (the whole document).
(Continued)

*Primary Examiner* — Jenna A Watts
(74) *Attorney, Agent, or Firm* — Barnes & Thornburg LLP; Jeffrey R. Stone

(57) ABSTRACT

The present method is directed in one embodiment to a non-soluble, substantially white granular salt substitute for dough-based products. In certain embodiments, the dough-based product comprises a filling sealed within a pocket while in other embodiments, the dough-based product is not filled. In certain embodiments, the dough-based product is heated by baking, deep-frying or microwaving. In certain embodiments, the salt substitute of the present invention may be used in place of other large-particulate salts such as kosher salt for use on dough-based products. Certain non-dough-based products such as salted caramel ice cream, confections, as well as products utilizing a reduced-salt blend are also improved using the present invention. In certain embodiments, the salt substitute comprises white tapioca.

21 Claims, 1 Drawing Sheet

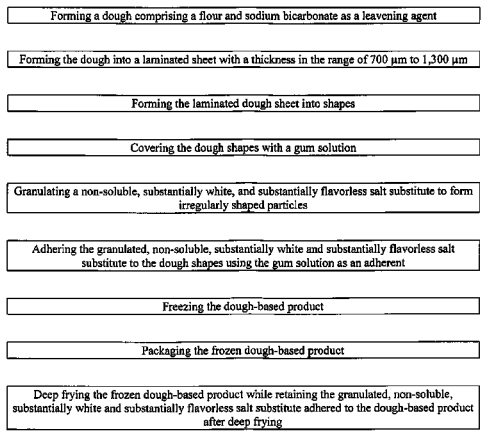

Related U.S. Application Data which is a continuation-in-part of application No. 13/686,088, filed on Nov. 27, 2012, now Pat. No. 9,750,270.

(60) Provisional application No. 61/564,644, filed on Nov. 29, 2011.

(51) Int. Cl.
| | |
|---|---|
| *A23L 29/219* | (2016.01) |
| *A21D 4/00* | (2006.01) |
| *A23G 3/36* | (2006.01) |
| *A23G 9/32* | (2006.01) |
| *A23G 9/34* | (2006.01) |
| *A23L 7/117* | (2016.01) |
| *A23L 27/40* | (2016.01) |
| *A21D 13/60* | (2017.01) |
| *A21D 13/28* | (2017.01) |
| *A21D 13/22* | (2017.01) |

(52) U.S. Cl.
CPC .............. *A21D 13/28* (2017.01); *A21D 13/60* (2017.01); *A23G 3/36* (2013.01); *A23G 3/42* (2013.01); *A23G 9/32* (2013.01); *A23G 9/34* (2013.01); *A23L 7/117* (2016.08); *A23L 27/45* (2016.08); *A23L 29/015* (2016.08); *A23L 29/03* (2016.08); *A23L 29/212* (2016.08); *A23L 29/219* (2016.08)

(56) References Cited

U.S. PATENT DOCUMENTS

| | | |
|---|---|---|
| 5,902,410 A | 5/1999 | Chiu et al. |
| 2006/0073239 A1 | 4/2006 | Boyle et al. |
| 2006/0216395 A1 | 9/2006 | Franklin |
| 2007/0087102 A1 | 4/2007 | McPherson et al. |
| 2008/0032006 A1 | 2/2008 | Villagran et al. |
| 2009/0081335 A1 | 3/2009 | Ortiz et al. |
| 2011/0014320 A1 | 1/2011 | Zable |

FOREIGN PATENT DOCUMENTS

| | | |
|---|---|---|
| WO | 97/40704 | 11/1997 |
| WO | 2011/031841 | 3/2011 |

OTHER PUBLICATIONS

"Tapioca", Available online as of Oct. 15, 2009 from http://thaifoodandtravel.com. pp. 1-5.

"Tapioca Pudding". 101Cookbooks.com, available onelin as of Nov. 4, 2007. pp. 1-14.

"What's the difference between kosher salt, sea salt, and table salt?". Available online as of Mar. 14, 2012 from www.healthnutnation.com. pp. 1-5.

"Wonton Wrappers". Available online as of Jun. 29, 2005 from "Lily's Wai Sek Hong", lilyng2000.blogspot.com. pp. 1-6.

International Preliminary Report on Patentability issued in related application No. PCT/US2014/071184, dated Jun. 30, 2016.

```
┌─────────────────────────────────────────────────────────────────────────────────┐
│      Forming a dough comprising a flour and sodium bicarbonate as a leavening agent      │
└─────────────────────────────────────────────────────────────────────────────────┘

┌─────────────────────────────────────────────────────────────────────────────────┐
│  Forming the dough into a laminated sheet with a thickness in the range of 700 μm to 1,300 μm  │
└─────────────────────────────────────────────────────────────────────────────────┘

┌─────────────────────────────────────────────────────────────────────────────────┐
│                       Forming the laminated dough sheet into shapes                       │
└─────────────────────────────────────────────────────────────────────────────────┘

┌─────────────────────────────────────────────────────────────────────────────────┐
│                         Covering the dough shapes with a gum solution                         │
└─────────────────────────────────────────────────────────────────────────────────┘

┌─────────────────────────────────────────────────────────────────────────────────┐
│  Granulating a non-soluble, substantially white, and substantially flavorless salt substitute to form  │
│                                    irregularly shaped particles                                    │
└─────────────────────────────────────────────────────────────────────────────────┘

┌─────────────────────────────────────────────────────────────────────────────────┐
│    Adhering the granulated, non-soluble, substantially white and substantially flavorless salt    │
│              substitute to the dough shapes using the gum solution as an adherent              │
└─────────────────────────────────────────────────────────────────────────────────┘

┌─────────────────────────────────────────────────────────────────────────────────┐
│                              Freezing the dough-based product                              │
└─────────────────────────────────────────────────────────────────────────────────┘

┌─────────────────────────────────────────────────────────────────────────────────┐
│                          Packaging the frozen dough-based product                          │
└─────────────────────────────────────────────────────────────────────────────────┘

┌─────────────────────────────────────────────────────────────────────────────────┐
│   Deep frying the frozen dough-based product while retaining the granulated, non-soluble,   │
│ substantially white and substantially flavorless salt substitute adhered to the dough-based product │
│                                         after deep frying                                         │
└─────────────────────────────────────────────────────────────────────────────────┘
```

GRANULATED STARCH SALT SUBSTITUTE

CROSS-REFERENCE TO RELATED APPLICATIONS

This application is a continuation-in-part of application Ser. No. 14/136,400, filed Dec. 20, 2013, granted as U.S. Pat. No. 9,961,918, which is a continuation-in-part of application Ser. No. 13/686,088, filed Nov. 27, 2012, granted as U.S. Pat. No. 9,750,270, which, in turn, claims the benefit and priority of U.S. provisional patent application 61/564,644, filed Nov. 29, 2011, the entire contents of which are hereby incorporated herein.

FIELD OF THE INVENTION

The present disclosure generally relates to the substitution of a non-soluble granulated product for sea salt or pretzel salt or other large-particulate salts such as kosher salt for use on dough-based products or non-dough-based products such as salted caramel ice cream, confections, as well as products utilizing a reduced-salt blend. In the case of dough-based products, the invention uses granulated salt substitute, made from starch, e.g., white tapioca, potato, or arrowroot on deep fried or baked dough-based products as a substitute for larger particulate salt such as sea salt, pretzel salt or kosher salt.

BACKGROUND

Dough-based products, either baked or deep fried, are popular snacks. One exemplary product comprises pretzels, in both soft, i.e., hot and fresh, and packaged, shelf-stable forms. Pretzels are often consumed with a dip and several known pretzel products comprise a dip as a filling within the pretzel body. These known products are deficient in a number of ways:

1. The traditional pretzel shape, i.e., a knot, is difficult to share as it requires ripping, cutting and/or tearing by consumers.
2. Traditional reheating methods for end consumers, including restaurant operators for known pretzels is not optimal. Microwave cooking is fast, but the product quality is compromised. Baking requires more cooking time than microwaving. Applicant is unaware of any known pretzel products comprising a filling that have been developed for deep-frying, the reasons for which are discussed further below.
3. Loss of filling during the reheating process.
4. Inconsistent salt flavoring. Addition of large particulate pretzel salt, or sea salt on various other dough-based products, results in an inconsistency of salt flavor; some bites will be salt free and bland while others will be too heavily salted.
5. Labor intensive product preparation. Some soft pretzel products, and other dough-based products, require manual application of pretzel, or sea, salt; this manual step is undesirable in a restaurant setting as well as other end user. The necessity for manually applying large particulate salt on these products is driven by the solubility of salt. As a consequence, during the adherence of the product to raw, moist dough and freezing and/or the heating process, i.e., baking, the large particulate salt may dissolve, thereby resulting in a loss of the essential characteristics of a salted pretzel, or other similar dough-based product. Adhering large particulate salt to cooked dough followed by freezing of the cooked dough product may also cause the salt to dissolve.

These essential characteristics of, e.g., pretzel salt or sea salt when applied to dough-based products, which are provided by the present invention, comprise:

1. A consistency of saltiness in each portion or bite. This characteristic is often lost in known products that rely on large particulate salt such as pretzel, sea or kosher salt when the larger particulate salt is not evenly dispersed across the product.
2. The particulate size and shaping of pretzel salt, i.e., visible irregularly shaped substantially white particles.
3. The slight crunchiness of pretzel salt or sea salt when applied to dough-based products post-heating. Deep frying of, e.g., a granulated particulate white tapioca results in a softening of the granulated white tapioca to obtain a crunchiness that mimics the pretzel salt crunch, for example. In other non-pretzel applications the crunchiness of the granulated tapioca may be modified and optimized through thermal processing such as baking to obtain the desired crunchiness. The present invention may be manufactured by granulating starch compositions, e.g., tapioca, potato or arrowroot starch may be used.

BRIEF SUMMARY OF THE INVENTION

The present method is directed in one embodiment to a non-soluble, substantially white granular salt substitute for dough-based products. In certain embodiments, the dough-based product comprises a filling sealed within a pocket while in other embodiments, the dough-based product is not filled. In certain embodiments, the dough-based product is heated by baking, deep-frying or microwaving. In certain embodiments, the salt substitute of the present invention may be used in place of other large-particulate salts such as kosher salt for use on dough-based products. Certain non-dough-based products such as salted caramel ice cream, confections, as well as products utilizing a reduced-salt blend are also improved using the present invention. In certain embodiments, the salt substitute comprises granulated white tapioca. In other embodiments, the salt substitute comprises granulated potato or arrowroot starch substances.

The figures and the detailed description which follow more particularly exemplify these and other embodiments of the invention.

BRIEF DESCRIPTION OF THE DRAWINGS

FIG. 1 illustrates a flow chart for one embodiment of the present invention.

DETAILED DESCRIPTION

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

The present disclosure is generally directed, in one embodiment, to a food product such as a dough-based product comprising non-soluble, substantially white, granular salt substitute having a texture with a crunchiness mimicking that of pretzel salt or kosher salt thereon or incorporated therein. The salt substitute may be applied or added to the food product at a point in the manufacturing process that is prior to freezing and subsequent heating of the raw dough-based product and, therefore, the salt substitute must be non-soluble in order to withstand the process of adhering the salt substitute to the raw dough and subsequent freezing of the raw dough-based product as well as deep frying and/or baking or microwaving. In each of these embodiments, the salt substitute comprises essential characteristics comprising consistency of saltiness in each bite (where a sodium-based product such as salt is blended or mixed with the salt substitute and/or to the food product), visibly irregularly shaped and substantially white granulated particles manufactured from tapioca pearls or sticks or flakes or other configuration, or from arrowroot or potato starch products, and a crunchiness mimicking the crunchiness of pretzel salt.

Measuring the texture of foods, specifically "crunchiness", and comparing the results of the crunchiness measurements between food products, may be achieved by a number of methods, including measuring sound intensity over time during chewing activity, measuring frequencies produced during chewing activity, and observing and recording tactile sensations during chewing activity. In this way, the crunchiness of the salt substitute, e.g., granulated white pearl tapioca, may be compared with the crunchiness of other substances, e.g., pretzel salt or kosher salt. In the context of the invention, thermal processing, described further below, is utilized to bring the crunchy texture of the granulated starch comprising, e.g., white tapioca, arrowroot or potato products obtained from, without limitation, pearl, flake or stick form to a comparable crunchiness with that of pretzel salt, sea salt or kosher salt.

As described above, baking and/or microwaving will participate in the dissolution of the large particulate salts when latent moisture is present as in known products and processes.

In certain embodiments, the food product, e.g., a dough-based product will comprise shapes comprising: a square, a half round or half circle, a triangle, a rectangle, a cylinder, a pretzel knot, as well as any other shaping as the skilled artisan will recognize. In some of these embodiments, the dough-based product will comprise a pocket with filling, e.g., a pretzel product with a pocket, that is sealed inside the dough-based product. These filled dough-based products will be shaped from a sheet of dough having a thickness, the filling is then deposited onto the shaped product, thereby forming the pocket when the dough is folded over the filling, encapsulating or enclosing the filling therein. The seal is then created which consists of compressing the edges of the dough-based product together. One of the basic complaints with known products is the loss of filling during a heating process, e.g., baking or microwaving. This is as a result of an ineffectively sealed edge and/or the dough sheet being too thin. An alternative is to form the dough shape, then inject the dough shape with a filling which is a known embodiment that is also susceptible to filling loss.

In certain embodiments of the present invention, the thickness of the dough sheeting will be in the range of about 2,000 μm to about 3,000 μm. In other embodiments, the dough sheeting may comprise a thickness of about 2,000 μm to about 3,500 μm. In other embodiments, the dough sheeting may comprise a thickness of about 2,000 μm to about 4,000 μm. In still other embodiments, the dough sheeting may comprise a thickness of about 3,000 μm to about 4,000 μm. In additional embodiments, the dough sheeting may comprise a thickness of about 700 μm to about 1,300 μm or, in other embodiments, about 500 μm to about 4,000 μm.

The seal around at least a portion of the dough-based product comprises a sealed edge having a width, wherein the edges of the folded dough are compressed. In some embodiments, this seal may be ¼ inches wide while in other embodiments the seal may be ⅜ inches wide, while in still other embodiments, the width of the sealed edge may be ½ inches wide. In certain embodiment, the sealed edge may be at least ¼ inches wide.

The combination of the dough sheeting thickness and the sealed edge width create a dough-based product from which the filling, encapsulated within a pocket, cannot escape during the heating process.

One or more of the dough sheeting, shaping and folding may be done manually or using one or more machines as is known in the art.

Turning to FIG. 1, one embodiment of the present invention is illustrated as process 100.

Initially, the process begins by forming a dough comprising a flour and sodium bicarbonate and/or yeast as a leavening agent 10.

Next, the formed dough is further formed into a laminated sheet with a thickness in the range of preferably 700 μm to 1,300 μm in step 20.

Next, the laminated dough sheet is formed into shapes 30. In certain embodiments, the shapes may comprise a pocket with filling deposited thereon and therein. In these embodiments, the dough sheet may be folded over, with the filling having been enclosed within the dough sheet and pocket. Then, the edges where the folded dough come together are sealed, with a sealing width of at least ¼ inches. One preferred width for the sealed edge is ½ inch, though other widths will readily present themselves to the skilled artisan.

The formed shapes are then covered, e.g., by spraying or brushing and the like, with a gum solution 40. The gum solution may comprise gum arabic, xanthan gum and/or guar gum or the equivalent.

Next, a non-soluble, substantially white, and substantially flavorless salt substitute is granulated to form irregularly shaped particles 50. A preferred substance for the salt substitute is white tapioca which may be granulated from, e.g., pearl, stick or flake form to obtain the desired particle shaping and sizing. A preferred particle size for the salt substitute of the present invention simulates that of, e.g., pretzel salt or sea salt and will be in the range of approximately 200 μm to 4,000 μm. A more preferred particle size range for the salt substitute of the present invention comprises approximately 200 μm to 3,000 μm, with an even more preferred particle size range may comprise 200 μm to approximately 1600 μm. A still more preferred size of the irregularly shaped granulated substantially white tapioca particles is within the range of approximately 800 μm to approximately 1,200 μm.

Then, the granulated, non-soluble, substantially white and substantially flavorless salt substitute is adhered to the exterior of the dough shapes using the gum solution as an adherent 60.

In a preferred embodiment, the texture of the granulated salt substitute, e.g., the granulated starch product described herein, shall mimic that of pretzel salt, kosher salt, sea salt and the like when eaten, including a crunchy and/or crispy texture that is not chewy or hard. To achieve this crunchy texture, the granulated salt substitute, e.g., granulated tapioca, potato or arrowroot, must be subjected to a thermal process, which may occur before and/or after granulating the starch, to achieve the desired crunchy texture. In cases where the thermal processing occurs prior to starch granulation, the size and form of the starch product, e.g., white tapioca, arrowroot or potato products in, for example and without limitation, pearl, flake or stick form, will dictate the appropriate thermal process. In cases where thermal processing occurs after granulation of the starch, the particular thermal process selected may vary by application. For example, the granulated salt substitute of the present invention may undergo thermal processing, e.g., baking, before or after the granulated salt substitute is added to the food product. Thus, the granulated salt substitute of the present invention may be added to a food product, e.g., crackers, with subsequent thermal processing for both the granulated salt substitute and the crackers whereby the crackers are baked and the granulated salt substitute achieves the desired crunchy texture.

For example, acceptable thermal processes for achieving the crunchy texture mimicking, e.g., pretzel salt, sea salt or kosher salt, include inter alia, frying, baking and roasting the granulated salt substitute comprising a granulated starch, e.g., granulated tapioca, potato or arrowroot as described herein. Equipment for the thermal processing of the salt substitute comprises, as is known in the art, fryers generally and including for example, deep fryers and paddle fryers, and ovens, e.g., conventional ovens, convection ovens, conveyor ovens, tunnel ovens, and impingement ovens. The thermal processing equipment may, or may not, include integrated conveyers as will be understood by the skilled artisan.

In each case, the thermal processing temperature and processing time results in granulated salt substitute, e.g., granulated tapioca, with a texture that mimics the crunchiness of pretzel salt and the like while still maintaining the substantially white color of the salt substitute, e.g., granulated tapioca. It is noteworthy that excessive temperature and/or length of time in the thermal processing equipment results in a texture that does not mimic the crunchiness of pretzel or kosher salt. Among other issues, a browning or a caramelization may occur, each of which are highly undesirable as one of the essential characteristics of the present invention is that the salt substitute comprise a substantial whiteness. On the other hand, if the temperature and/or the processing time in the thermal processing equipment is too low or too short, respectively, then the texture produced in the salt substitute, e.g., granulated tapioca, will be too hard and, therefore, not crunchy when eaten.

Exemplary thermal processing for a dough-based product may comprise deep frying for approximately two minutes just prior to consumption. In other embodiments, the thermal processing may occur in conjunction with other food processing steps. In still other embodiments, the thermal processing may occur before any other food processing steps. For example, production of the desired crunchy texture while still retaining the substantially white color of the exemplary granulated tapioca may comprise making the granulated tapioca at a temperature within the range of 300 to 375 degrees Fahrenheit for a thermal processing time within the range of 10 to 18 minutes. A more preferred processing time may comprise the range of 12 to 15 minutes in combination with a preferred processing temperature of 350 degrees. Alternate time and processing temperature ranges to achieve the goals of the presently described invention may comprise the range of 6 to 18 minutes with a processing temperature in the range of 300 to 475 degrees Fahrenheit. And in still other embodiments, thermal processing may occur prior to granulation of the starch product, e.g., white tapioca, arrowroot or potato products in pearl, flake or stick form.

In other embodiments, the granulated, non-soluble, substantially white and substantially flavorless salt substitute may be adhered, deposited, mixed, blended, embedded or otherwise incorporated into the food product, wherein the food product comprises both dough-based and non-dough-based products, during the food production process, including mixing or blending with a sodium-based product such as salt when the a consistent salt flavor is required.

The exemplary dough-based product may then be frozen 70 and packaged 80 for future heating which may comprise deep frying the frozen dough-based product while retaining the granulated, non-soluble, substantially white and substantially flavorless salt substitute adhered to the dough-based product after deep frying 90. An alternative heating method may comprise baking and/or microwaving.

In certain embodiments, small particulate, i.e., crystallized, salt may be added to the dough prior to the heating process and mixed therethrough to ensure a consistency of salt flavoring which may be lacking in currently known dough-based products relying on large particulate salt such as sea or pretzel salt, with the granulated starch, e.g., white granulated tapioca, on the exterior of the dough-based food product. In alternate embodiments, this crystallized small particulate salt may be mixed with the gum solution that is applied to the exterior of the shaped dough product.

As discussed above, this process comprises addition of a visible non-soluble salt substitute for, e.g., sea or pretzel salt or kosher salt, that is applied at some point before the freezing of the raw dough-based product, including but not limited to immediately before the freezing process, and its subsequent heating process. Known processes require addition of, e.g., sea or pretzel salt after the freezing and heating processes because of the solubility of salt resulting in its dissolution during freezing and/or heating, thereby losing many of the required characteristics described above, not the least of which is its visibility.

The above embodiments and processes thereof may be applied to a wide variety of dough-based food products including but certainly not limited to: pretzels, bagels, crackers and the like. Any dough-based product that may benefit from a visible large particle substantially white and non-salt flavored salt substitute such as, e.g., white pearl tapioca granules, is within the scope of the present invention.

In addition, non-dough-based food products such as salted caramel ice cream, confections, as well as products utilizing a reduced-salt blend may benefit from use and incorporation of the salt-substitute of the present invention. In these embodiments, the granulated salt substitute described herein may be deposited, mixed, blended, embedded or otherwise incorporated into the food product during the food production process, the production process ensuring that the salt substitute, e.g., granulated tapioca, comprise the essential characteristics of a consistency of saltiness in each bite (in the cases where a sodium-based product, e.g., salt, is blended or mixed with the salt substitute of the present invention, visibly irregularly shaped and substantially white granulated particles and a crunchiness mimicking the crunchiness of pretzel salt.

In additional embodiments, the granulated salt substitute described herein may be blended with sodium-based products, for example but without limitation, salt, to produce a reduced sodium blend with the essential characteristics discussed above including a consistency of saltiness in each bite, visibly irregularly shaped and substantially white granulated particles and a crunchiness mimicking the crunchiness of sea salt or kosher salt.

While the methods have been described in reference to some exemplary embodiments, these embodiments are not limiting and are not necessarily exclusive of each other, and it is contemplated that particular features of various embodiments may be omitted or combined for use with features of other embodiments while remaining within the scope of the invention.

What is claimed is:

1. A food product comprising:
   non-soluble granulated starch selected from the group comprising tapioca, arrowroot, and potato, the granulated starch comprising
   granule particle sizes in the range of about 200 μm to 4,000 μm;
   a substantially white color; and
   a texture having a crunchiness comparable to the crunchiness of pretzel salt, sea salt and/or kosher salt as measured by one of the group consisting of: sound intensity over time during chewing activity; frequencies produced during chewing activity, and tactile sensations observed during chewing activity.

2. The food product of claim 1, further comprising dough; and a gum solution covering the dough, the non-soluble, granulated, substantially white starch adhered to the dough using the gum solution as an adherent.

3. The food product of claim 2, further comprising the gum solution being selected from the group consisting of gum Arabic, xanthan gum, and guar gum.

4. The food product of claim 2, further comprising a sodium-based product mixed with the gum solution.

5. The food product of claim 2, further comprising a blend of crystalline salt and the non-soluble, granulated, substantially white starch.

6. The food product of claim 1, further comprising dough, wherein the non-soluble granulated substantially white starch product is incorporated in the dough.

7. The food product of claim 1, wherein the non-soluble granulated and substantially white starch is incorporated in the dough by at least one of the group consisting of: adhering, mixing, blending, depositing, and embedding.

8. The food product of claim 4, further comprising the sodium-based product mixed together with the non-soluble granulated and substantially white starch, the resulting mixture incorporated in the dough.

9. The food product of claim 2, further comprising the sodium-based product mixed together with the non-soluble granulated and substantially white starch, the resulting mixture incorporated in the dough.

10. The food product of claim 2, further comprising the sodium-based product mixed into the dough.

11. The food product of claim 1, wherein the food product comprises one of the group consisting of: pretzels, crackers, bagels, confections, and ice cream.

12. A method for achieving a crunchiness for non-soluble, granulated, substantially white starch for use as a salt substitute and that is comparable to the crunchiness of pretzel salt as determined by measuring the sound intensity over time during chewing activity; frequencies produced during chewing activity, and tactile sensations observed during chewing activity, while maintaining a substantially white color for the granulated and substantially white starch, the method comprising:
    granulating the substantially white starch to a particle size within the range of about 200 μm to 4,000 μm; and
    after the granulating is completed, thermally processing the granulated substantially white starch at a temperature within the range of 300 to 475 degrees Fahrenheit and for a thermal processing time within the range of 6 to 18 minutes.

13. The method of claim 12, further comprising a food product and wherein the food product and the granulated substantially white starch are combined and undergo thermally processing together after the combining.

14. The method of claim 12, wherein thermally processing comprises one of the group consisting of: a deep fryer, a conventional oven, a convection oven, a conveyor oven, a tunnel oven, and an impingement oven.

15. The method of claim 12, wherein the substantially white starch consists of at least one selected from the group consisting of: tapioca, arrowroot and potato.

16. A method for achieving a crunchiness for non-soluble, granulated, substantially white starch for use as a salt substitute and that is comparable to the crunchiness of pretzel salt as determined by measuring the sound intensity over time during chewing activity; frequencies produced during chewing activity, and tactile sensations observed during chewing activity, while maintaining a substantially white color for the granulated and substantially white starch, the method comprising:
    thermally processing the granulated substantially white starch at a temperature within the range of 300 to 475 degrees Fahrenheit and for a thermal processing time within the range of 6 to 18 minutes; and
    after the thermally processing is complete, granulating the substantially white starch to a particle size within the range of about 200 μm to 4,000 μm.

17. The method of claim 16, further comprising a food product and wherein the food product and the granulated substantially white starch are combined and undergo thermally processing together after the combining.

18. The method of claim 16, wherein the substantially white starch consists of at least one selected from the group consisting of: tapioca, arrowroot and potato.

19. A reduced-sodium blend food product comprising:
    non-soluble, substantially white, granulated starch thermally processed to a crunchiness comparable with the crunchiness of sea salt or kosher salt; and
    a sodium-based product.

20. The reduced-sodium blend food product of claim 18, wherein the sodium-based product comprises crystalline salt.

21. The reduced-sodium blend food product of claim 18, wherein the non-soluble, substantially white and granulated starch comprises a particle size within the range of about 200 μm to 4,000 μm.

* * * * *